US006961347B1

(12) United States Patent  
Bunton et al.

(10) Patent No.: US 6,961,347 B1  
(45) Date of Patent: Nov. 1, 2005

(54) HIGH-SPEED INTERCONNECTION LINK HAVING AUTOMATED LANE REORDERING

(75) Inventors: William P. Bunton, Pflugerville, TX (US); John Krause, Georgetown, TX (US); Patricia L. Whiteside, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1174 days.

(21) Appl. No.: 09/597,190

(22) Filed: Jun. 20, 2000

(51) Int. Cl.$^7$ ................................................. H04J 3/16
(52) U.S. Cl. ...................................... 370/465; 370/509
(58) Field of Search ................................ 370/229, 230, 370/231, 235, 237, 351, 389, 394, 401, 463, 370/465, 489, 583, 535, 536, 537, 542; 710/29, 710/30

(56) References Cited

U.S. PATENT DOCUMENTS

| | | | | |
|---|---|---|---|---|
| 5,304,996 A | * | 4/1994 | Hsu et al. ...................... | 341/95 |
| 5,570,356 A | * | 10/1996 | Finney et al. ................ | 370/476 |
| 5,619,497 A | * | 4/1997 | Gallagher et al. .......... | 370/394 |
| 5,978,419 A | * | 11/1999 | Cassiday et al. ............ | 375/257 |
| 6,158,014 A | * | 12/2000 | Henson ...................... | 713/501 |
| 6,167,077 A | * | 12/2000 | Ducaroir et al. ............ | 375/219 |
| 6,243,787 B1 | * | 6/2001 | Kagan et al. ................ | 710/263 |
| 6,549,540 B1 | * | 4/2003 | Ward .......................... | 370/412 |
| 6,646,991 B1 | * | 11/2003 | Drottar et al. .............. | 370/238 |
| 6,690,757 B1 | * | 2/2004 | Bunton et al. .............. | 375/371 |
| 6,792,003 B1 | * | 9/2004 | Potluri et al. ............... | 370/476 |
| 6,865,231 B1 | * | 3/2005 | Bunton et al. .............. | 375/246 |

OTHER PUBLICATIONS

Infiniband Architecture Specification vol. 2 Release 1.0, Chapter 5: Link/Phy Interface, pp. 1-5 and 65-131, Oct. 2000.*

Martin, Hari Coding Objectives for 10G FC, www.t10.org/ftp/t11/document.99/99-745v0.pdf, pp. 1-22, Dec. 8, 1999.*

U.S. Appl. No. 09/597,192, filed Jun. 20, 2000, and entitled "High-Speed Interconnection Adapter Having Automated Crossed Differential Pair Correction" by William P. Bunton, John Krause and Patricia L. Whiteside.

U.S. Appl. No. 09/596,980, filed Jun. 20, 2000, and entitled "High-Speed Interconnection Adapter Having Automated Lane De-Skew" by William P. Bunton, John Krause, Patricia L. Whiteside and Scott Smith.

(Continued)

*Primary Examiner*—Frank Duong

(57) ABSTRACT

A multi-lane link that automatically detects if the lanes in the link have been reordered and corrects the order of the lanes. In one embodiment, the link includes a transmitter and a receiver. The receiver is configured to receive a plurality of lanes and includes a receiver logic circuit configured to receive signals from each of the plurality of lanes. Lane misordering is corrected during a training sequence in which a first training sequence and a second training sequence are bilaterally transmitted between the transmitter and receiver. The receiver monitors the training sequence for symbols that are unique to each lane and if an unexpected symbol is detected in the lane, the receiver logic circuit will correct the order of the lanes. The link further comprises a transmitter logic circuit configured to transmit signals to the lanes. The transmitter logic circuit is configured to reorder the sequence of the signals transmitted to the lanes if the transmitter does not detect a response from the receiver. The transmitter logic circuit may consist of a bank of multiplexers configured to transmit a selected one of two input signals to be transmitted through a lane. Similarly, the receiver logic circuit may comprises a bank of multiplexers configured to transmit a selected one of two input signals received from a lane. The unique lane identifiers symbols are preferably insensitive to binary inversion and are preferably 10-bit symbols compatible with an 8B/10B encoding scheme.

3 Claims, 12 Drawing Sheets

OTHER PUBLICATIONS

"A DC-Balanced, Partitioned-Block, 8B/10B Transmission Code," IBM J. Res. Develop., vol. 27 No. 5, Sep. 1983 by A. X. Widmer and P.A. Franaszek, pp. 440-451, Tables (6 p.)

"Compaq's InfiniBand™ Architectural Strategy," Technology Brief, Mar. 2000, pp. 1-11.

* cited by examiner

TRAINING SET 1 (TS1)

| COM LANE 0 | COM LANE 1 | COM LANE 2 | COM LANE 3 |
|---|---|---|---|
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |

TRAINING SET 2 (TS2)

| COM LANE 0 | COM LANE 1 | COM LANE 2 | COM LANE 3 |
|---|---|---|---|
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |

FIG. 5

Physical Link Lane Identifiers

| LANE IDENTIFIER | 8B/10B CODE NAME | NEGATIVE RD | POSITIVE RD |
|---|---|---|---|
| LID 0 | D0.0 | 10011 10100 | 01100 01011 |
| LID 1 | D1.0 | 01110 10100 | 10001 01011 |
| LID 2 | D2.0 | 10110 10100 | 01001 01011 |
| LID 3 | D4.0 | 11010 10100 | 00101 01011 |
| LID 4 | D8.0 | 11100 10100 | 00011 01011 |
| LID 5 | D15.0 | 01011 10100 | 10100 01011 |
| LID 6 | D16.0 | 01101 10100 | 10010 01011 |
| LID 7 | D23.0 | 11101 00100 | 00010 11011 |
| LID 8 | D24.0 | 11001 10100 | 00110 01011 |
| LID 9 | D27.0 | 11011 00100 | 00100 11011 |
| LID 10 | D29.0 | 10111 00100 | 01000 11011 |
| LID 11 | D30.0 | 01111 00100 | 10000 11011 |

FIG. 6

HIGH-SPEED INTERCONNECTION LINK HAVING AUTOMATED LANE REORDERING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to high bandwidth interconnections for use in networking environments such as local area networks (LAN), wide area networks (WAN) and storage area networks (SAN). More specifically, it relates to a method of correcting lane reversal in signals resulting from varying paths and routing requirements in multiple, parallel signal carriers.

2. Description of Related Art

Internet and electronic commerce has grown to the point where demands placed on existing computer systems are severely testing the limits of system capacities. Microprocessor and peripheral device performances have improved to keep pace with emerging business and educational needs. For example, internal clock frequencies of microprocessors have increased dramatically, from less than 100 MHz to more than 1 GHz over a span of less than ten years. Where this performance increase in inadequate, high performance systems have been designed with multiple processors and clustered architecture. It is now commonplace for data and software applications to be distributed across clustered servers and separate networks. The demands created by these growing networks and increasing speeds are straining the capabilities of existing Input/Output (I/O) architecture.

Peripheral Component Interconnect (PCI), released in 1992, is perhaps the most widely used I/O technology today. PCI is a shared bus-based I/O architecture and is commonly applied as a means of coupling a host computer bus (front side bus) to various peripheral devices in the system. Publications that describe the PCI bus include the *PCI Specification, Rev. 2.2*, and *Power Management Specification 1.1*, all published by the PCI Special Interest Group. The principles taught in these documents are well known to those of ordinary skill in the art and are hereby incorporated herein by reference.

At the time of its inception, the total raw bandwidth of 133 MBps (32 bit, 33 MHz) provided by PCI was more than sufficient to sustain the existing hardware. Today, in addition to microprocessor and peripheral advancements, other I/O architectures such as Gigabit Ethernet, Fibre Channel, and Ultra3 SCSI are outperforming the PCI bus. Front side buses, which connect computer microprocessors to memory, are approaching 1–2 GBps bandwidths. It is apparent that the conventional PCI bus architecture is not keeping pace with the improvements of the surrounding hardware. The PCI bus is quickly becoming the bottleneck in computer networks.

In an effort to meet the increasing needs for I/O interconnect performance, a special workgroup led by Compaq Computer Corporation developed PCI-X as an enhancement over PCI. The PCI-X protocol enables 64-bit, 133 MHz performance for a total raw bandwidth that exceeds 1 GBps.

While this is indeed an improvement over the existing PCI standard, it is expected that the PCI-X bus architecture will only satisfy I/O performance demands for another two or three years.

In addition to the sheer bandwidth limitations of the PCI bus, the shared parallel bus architecture used in PCI creates other limitations which affect its performance. Since the PCI bus is shared, there is a constant battle for resources between processors, memory, and peripheral devices. Devices must gain control of the PCI bus before any data transfer to and from that device can occur. Furthermore, to maintain signal integrity on a shared bus, bus lengths and clock rates must be kept down. Both of these requirements are counter to the fact that microprocessor speeds are going up and more and more peripheral components are being added to today's computer systems and networks.

Today, system vendors are decreasing distances between processors, memory controllers and memory to allow for increasing clock speeds on front end buses. The resulting microprocessor-memory complex is becoming an island unto itself. At the same time, there is a trend to move the huge amounts of data used in today's business place to storage locations external to network computers and servers. This segregation between processors and data storage has necessitated a transition to external I/O solutions.

One solution to this I/O problem has been proposed by the Infiniband(SM) Trade Association. The Infiniband(SM) Trade Association is an independent industry body that is developing a channel-based, switched-network-topology interconnect standard. This standard will de-couple the I/O subsystem from the microprocessor-memory complex by using I/O engines referred to as channels. These channels implement switched, point to point serial connections rather than the shared, load and store architecture used in parallel bus PCI connections.

The Infiniband interconnect standard offers several advantages. First, it uses a differential pair of serial signal carriers, which drastically reduces conductor count. Second, it has a switched topology that permits many more nodes which can be placed farther apart than a parallel bus. Since more nodes can be added, the interconnect network becomes more scalable than the parallel bus network. Furthermore, as new devices are added, the links connecting devices will fully support additional bandwidth. This Infiniband architecture will let network managers buy network systems in pieces, linking components together using long serial cables. As demands grow, the system can grow with those needs.

The trend towards using serial interconnections as a feasible solution to external I/O solutions is further evidenced by the emergence of the IEEE 1394 bus and Universal Serial Bus (USB) standards. USB ports, which allow users to add peripherals ranging from keyboards to biometrics units, have become a common feature in desktop and portable computer systems. USB is currently capable of up to 12 MBps bandwidths, while the IEEE 1394 bus is capable of up to 400 MBps speeds. A new version of the IEEE 1394 bus (IEEE 1394b) can support bandwidth in excess of 1 GBps.

Maintaining signal integrity is extremely important to minimize bit error rates (BER). At these kinds of bandwidths and transmission speeds, a host of complications which affect signal integrity may arise in the physical layer of a network protocol. The physical layer of a network protocol involves the actual media used to transmit the digital signals. For Infiniband, the physical media may be a twisted pair copper cable, a fiber optic cable, or a copper backplane. Interconnections using copper often carry the transmitted signals on one or more pairs of conductors or traces on a printed circuit board. Each optical fiber or differential conductor pair is hereafter called a "lane".

Where multiple lanes are used to transmit serial binary signals, examples of potential problems include the reordering of the lanes and skew. Skew results from different lane lengths or impedances. Skew must be corrected so that data that is transmitted at the same time across several lanes will arrive at the receiver at the same time. Lane reordering must be corrected so a digital signal may be reconstructed and decoded correctly at the receiver end.

Even in the simplest case involving a single differential wire pair, a potential problem exists in the routing of the differential wire pair. It is possible for wires to be crossed either inadvertently, as in a cable miswire, or intentionally, as may be necessary to minimize skew. In transmitting digital signals via a differential wire pair, one wire serves as a reference signal while the other wire transmits the binary signal. If the wire terminations are incorrect, the binary signal will be inverted.

Conventional correction and prevention of these types of problems has been implemented with the meticulous planning and design of signal paths. Differential wire pairs are typically incorporated into cables as twisted wire pairs of equal lengths. However, matched delay or matched length cabling is more expensive because of the manufacturing precision required. In backplane designs, trace lengths may vary because of board congestion, wire terminations and connector geometries. Shorter traces are often lengthened using intentional meandering when possible to correct for delay caused by other components. It is often impractical to correct crossed differential pairs because one trace passes through two vias to "cross under" the other trace. The vias introduce a substantial time delay, thereby causing data skew. Alternatively, the differential pairs are left uncorrected and the data inversion is accounted for using pin straps or boundary scan techniques. Both of these fixes require intervention by the system designer. These techniques have also been used to correct lane reversal.

The physical layer in Infiniband carries signals encoded by a digital transmission code called "8B/10B". 8B/10B is an encoding/decoding scheme which converts an 8-bit word (i.e., a byte) at the link layer of the transport protocol to a 10-bit word that is transmitted in the physical layer of the same protocol.

The 8B/10B code is a "zero-DC" code, which provides some advantages for fiber optic and copper wire links. Transmitter level, receiver gain, and equalization are simplified and their precision is improved if the signals have a constant average power and no DC component. Simply stated, in converting an 8-bit word to a 10-bit word, the encoder selects the 10-bit representation based on the sign of the running disparity of the digital signal. Running disparity refers to a running tally of the difference between the number of 1 and 0 bits in a binary sequence. If the running disparity is negative (implying that more 0 bits have been transmitted than 1 bits), the subsequent 8B/10B word will contain more 1 bits than 0 bits to compensate for the negative running disparity. In the 8B/10B code, every 8-bit word has two 10-bit equivalent words. The 10-bit equivalent words will have five or more 1 bits for a negative running disparity and five or more 0bits for a positive running disparity. For a more detailed description of the 8B/10B code, refer to Widmer and Franaszek, "A DC-Balanced, Partitioned-Block, 8B/10B Transmission Code", IBM J. Res. Develop., Vol. 27, No. 5, September 1983, which is hereby incorporated by reference.

The above design considerations clearly make physical layer (i.e., cables, backplanes) manufacturing a difficult venture in high clock frequency systems. Design costs and manufacturing costs are drastically increased due to the need to alleviate these types of problems. It is desirable, therefore, to provide a method of automatically correcting these types of errors with information embedded in the signals. It is further desirable to develop a method of automatically detecting and correcting lane reversal of multiple lanes to ensure the signal is correctly reconstructed after transmission via multi-lane serial links. This method of correction may advantageously allow for less stringent design requirements and could decrease design and manufacturing costs for high bandwidth data links.

BRIEF SUMMARY OF THE INVENTION

The problems noted above are solved in large part by a high speed multi-lane interconnection link that automatically detects if the lanes in the link have been reordered and corrects the order of the lanes if the lanes are not in the correct order. In one embodiment, the link includes transmitter and a receiver. The receiver is configured to receive a plurality of lanes and includes a receiver logic circuit configured to receive signals from each of the plurality of lanes. Lane misordering is corrected during a training sequence in which a first training sequence and a second training sequence are bilaterally transmitted between the transmitter and receiver. The training sequences are comprised of data sequences of equal length that are transmitted through each of the lanes in the link. The receiver monitors the training sequence for symbols that are unique to each lane and if an unexpected symbol is detected in the lane, thereby implying that a lane misorder has occurred, the receiver logic circuit will correct the order of the lanes. The link further comprises a transmitter logic circuit configured to transmit signals to the lanes. The transmitter logic circuit is configured to reorder the sequence of the signals transmitted to the lanes if the transmitter does not detect a response from the receiver. The transmitter logic circuit may consist of a bank of multiplexers configured to transmit a selected one of two input signals to be transmitted through a lane. Similarly, the receiver logic circuit may comprises a bank of multiplexers configured to transmit a selected one of two input signals received from a lane. Alternatively, the link may include a bank of multiplexers in the receiver coupled to each of the lanes in the link. The multiplexers in the alternative embodiment are configured to redirect any of the input signals to any output of the multiplexer bank. The training sequences each include a unique lane identifier symbols for each lane in the link. The lane identifiers are preferably insensitive to binary inversion. The data transferred through the link is preferably transmitted as 10-bit symbols compatible with an 8B/10B encoding scheme.

BRIEF DESCRIPTION OF THE DRAWINGS

For a detailed description of the preferred embodiments of the invention, reference will now be made to the accompanying drawings in which:

FIG. 5 shows a table of the preferred training packets used to train ports that are coupled to opposite ends of a serial physical link;

FIG. 6 shows a table of the preferred lane identifiers used to label the individual channels in a serial physical link;

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
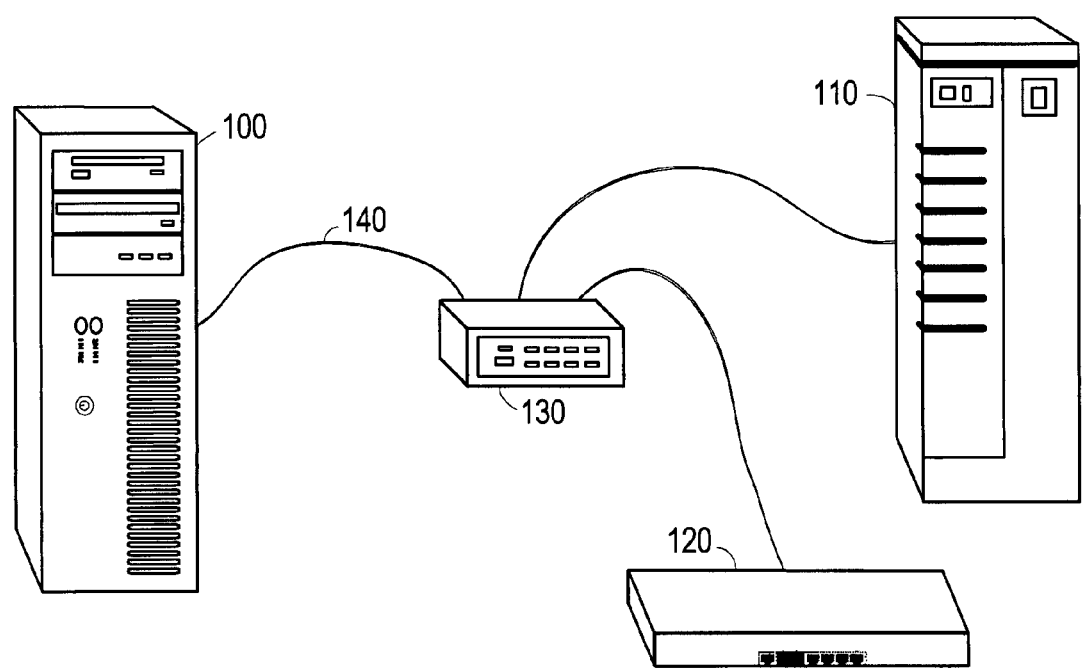
FIG. 1 shows an illustrative diagram of a simple computer network which supports serial connections.

FIG. 1 shows an example of a computer network representing a preferred embodiment, in which a central computer 100 is coupled to an external storage tower 110 and a network router 120 via a multiservice switch 130. Storage tower 110 may be internally connected by a Fibre Channel, SCSI, or any suitable storage network. Network router may be connected to a LAN (local area network) or ISDN (Integrated Services Digital Network) network or it may provide a connection to the internet via a suitable ATM (asynchronous transfer mode) network. It should be appreciated that any number of computers, servers, switches, hubs, routers, or any suitable network device can be coupled to the network shown in FIG. 1.

In the preferred embodiment shown in FIG. 1, the devices are connected via a point to point serial link 140. The serial link may comprise an even number of lanes or channels through which data is transmitted. Of the even number of lanes, half will transmit serial data in one direction while the other half transmits data in the opposite direction. In the preferred embodiment, the physical links will implement 1, 4, or 12 lanes in each direction. Thus, each link will have a total of 2, 8, or 24 total lanes.

In the latter two implementations (i.e., the 4 and 12 lane links), a single stream of bytes arriving at the input to the physical link are distributed evenly, or "striped", among the multiple lanes. In the case of the 12-lane link, the first byte is sent to the first lane, the second byte is sent to the second lane and so on until the $12^{th}$ byte is sent to the $12^{th}$ lane. At that point, the byte distribution cycles back to the first lane and the process continues. Thus, over time, each lane will carry an equal $1/12^{th}$ share of the bandwidth that the entire link carries. The same process and technique are used in the 4 lane link. Alternative embodiments with different numbers of lanes would preferably implement this striping process.

Once the bytes are distributed among the individual lanes, the 8-bit words are encoded into 10-bit words and transmitted through the physical link. At the output of the physical link, the 10-bit words are decoded back to 8-bit bytes and are re-ordered to form the original stream of 8-bit words.

Figure 2:
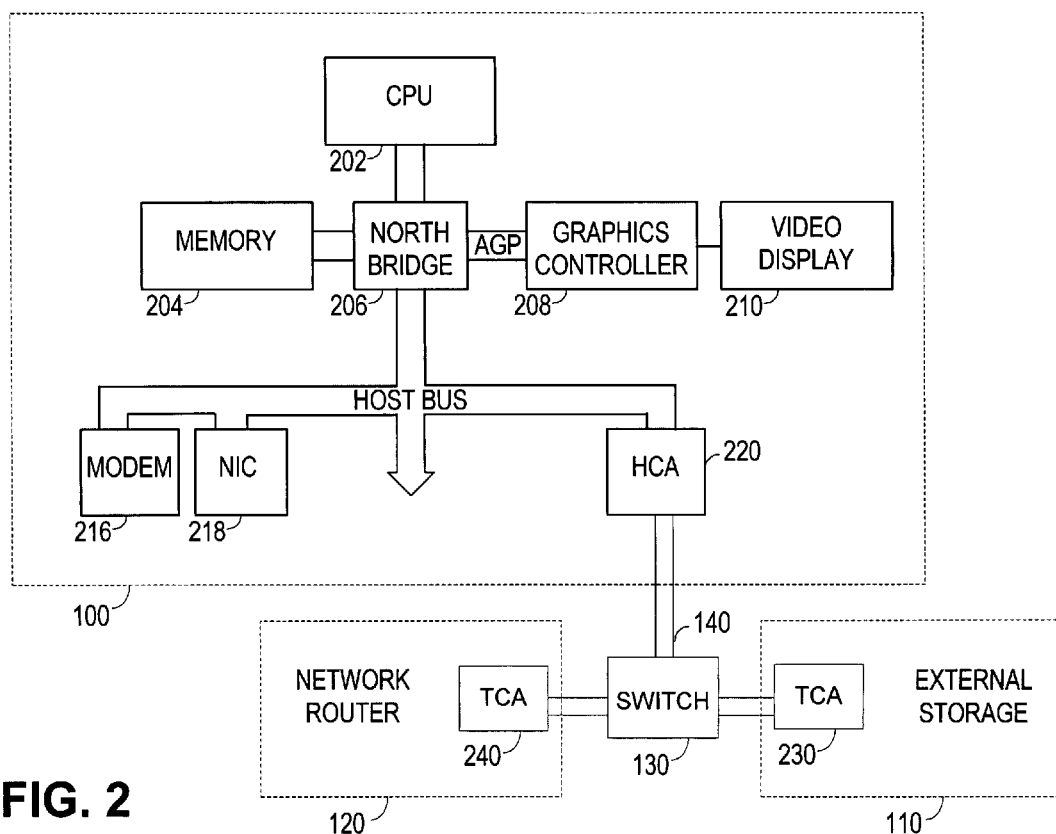
FIG. 2 shows a functional block diagram of a simple computer network which supports serial I/O connections.

FIG. 2 represents a functional block diagram of the computer network shown in FIG. 1. The computer 100 comprises a central processor unit (CPU) 202, a main memory array 204, and a bridge logic device 206 coupling the CPU 202 to the main memory 204. The bridge logic device is sometimes referred to as a "North bridge" for no other reason than it often is depicted at the upper end of a computer system drawing. The North bridge 206 couples the CPU 202 and memory 204 to various peripheral devices in the system through a primary expansion bus (Host Bus) such as a Peripheral Component Interconnect (PCI) bus or some other suitable architecture.

The North bridge logic 206 also may provide an interface to an Accelerated Graphics Port (AGP) bus that supports a graphics controller 208 for driving the video display 210. If the computer system 100 does not include an AGP bus, the graphics controller 208 may reside on the host bus.

Various peripheral devices that implement the host bus protocol may reside on the host bus. For example, a modem 216, and network interface card (NIC) 218 are shown coupled to the host bus in FIG. 2. The modem 216 allows the computer to communicate with other computers or facsimile machines over a telephone line, an Integrated Services Digital Network (ISDN), or a cable television connection, and the NIC 218 permits communication between computers over a local area network (LAN) (e.g., an Ethernet network card or a Cardbus card). These components may be integrated into the motherboard or they may be plugged into expansion slots that are connected to the host bus.

FIG. 2 also depicts a host channel adapter (HCA) 220 connected to the host bus and target channel adapters (TCA) 230, 240 connected to the external network devices 110, 120. These channel adapters provide address and translation capability for the switched topology architecture in the preferred embodiment. The channel adapters 220, 230, 240 preferably have dedicated IPv6 (Internet Protocol Version 6) addresses that can be recognized by the network switch 130. As data is transmitted to the network, the source file is divided into packets of an efficient size for routing. Each of these packets is separately numbered and includes the address of the destination. When the packets have all arrived, they are reassembled into the original file. The network switch 130 in this preferred embodiment can detect the destination address, and route the data to the proper location.

FIG. 2 also shows the physical links 140 between the network devices as two lane links. In the embodiment shown in FIG. 2, data would flow through one lane in one direction while data would flow through the parallel lane the other direction. As discussed above, alternative embodiments comprising any even number of lanes am also permissible, with 2, 8, and 24 lanes per link being the preferred number.

Figure 3:
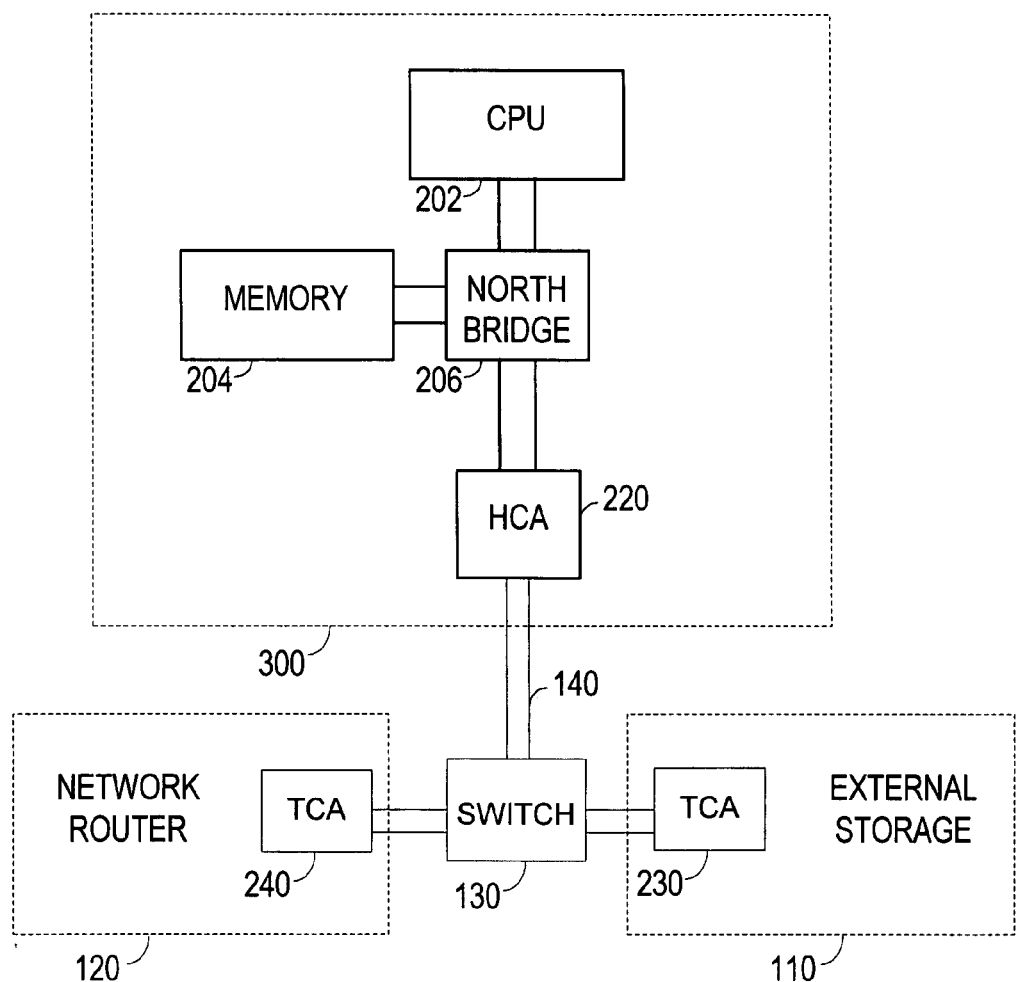
FIG. 3 shows a functional block diagram of an alternative computer network which supports serial I/O connections.

FIG. 3 shows an alternative embodiment of the computer network in which the computer 100 is replaced by a server

300 memory-processor architecture. Such a server may be part of a cluster of servers, a group of several servers that share work and may be able to back each other up If one server falls. In this particular embodiment, the server 300 is coupled to the switched-fabric network in much the same way the computer 100 of FIG. 1 is connected. The physical link 140 is connected to the server via a host channel adapter (HCA) 220. However, in this embodiment, the HCA 220 is connected directly to a North Bridge 206. Alternatively, the HCA 220 may be connected directly to a memory controller. In either event, a shared peripheral bus, such as a PCI bus, is not necessary in this embodiment. A peripheral bus may still be used in the server 300, but is preferably not used to couple the north bridge 206 to the HCA 220.

As discussed above, the serial data sent through the physical links is sent in the form of packets. The preferred embodiment uses the idea of packetized data and uses specialized packets called Training Set 1 and Training Set 2 to train the network devices prior to transmitting "real" data through the switched network. The actual content and structure of the training sets are discussed in further detail below.

Figure 4:
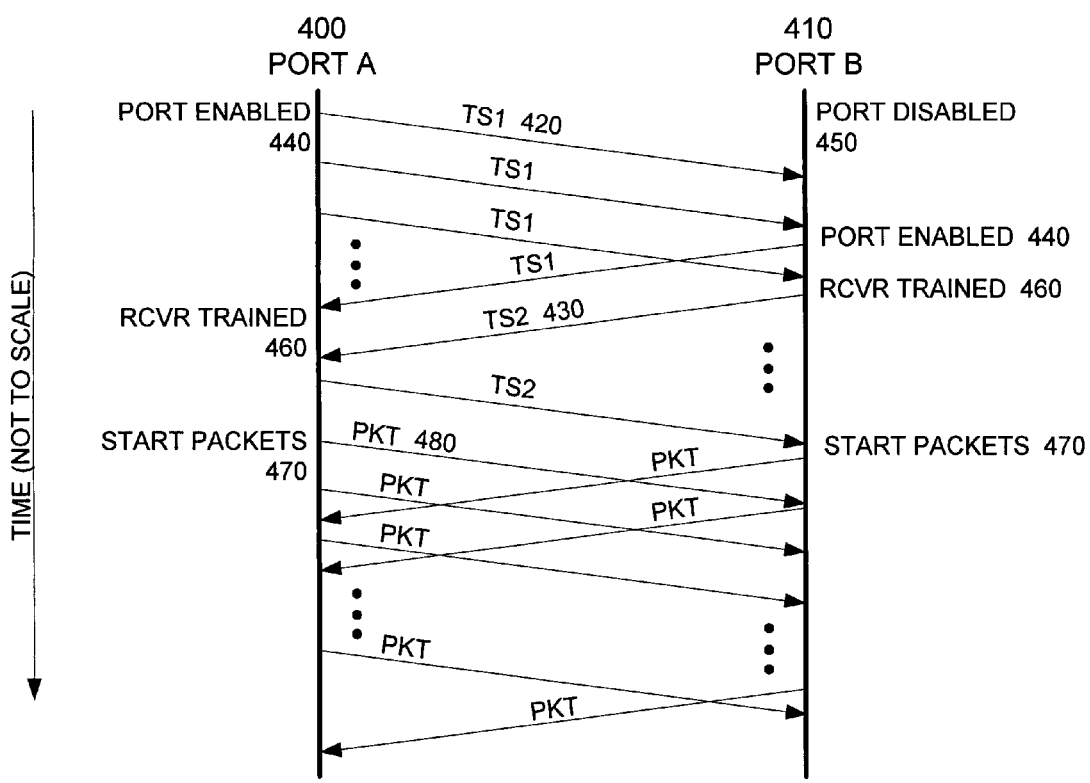
FIG. 4 shows a ladder diagram of the training sequence used to train ports that are coupled to opposite ends of a serial physical link.

FIG. 4 shows a link training ladder diagram describing the sequence of events during the training of ports located on either side of the physical link. In the preferred embodiment, a port refers to a transmitting and receiving device configured with a channel adapter to communicate via a serial link. In FIG. 4, Port A 400 refers to one such device while Port B 410 refers to the device at the other end of the serial link.

The training data, TS1 420 and TS2 430 are packets of known data that are transmitted between Port A 400 and Port B 410. The purpose behind the training sets are twofold. First, the initiation and duration of the training sequence is established by the transmission and reception of the training sets. Secondly, given that the training sets contain predetermined data, the transmit and receive ports can use this knowledge to correct for any errors (e.g., data inversion, lane skew) that may result during transmission through the physical link. Since the errors are a constant, permanent result of routing in the physical media, the training sequence may be used to automatically correct the errors for all subsequent data transferred through that physical link.

FIG. 4 represents a time line for both Port A 400 and Port B 410 with time elapsing toward the bottom of the figure. Before training begins, Port A 400 may exist in an enabled state 440 while Port B is in a disabled or link down state 450. By transmitting an initial sequence of TS1 training sets 420, Port A 400 can effectively wake up Port B 410 from a disabled state to an enabled state 440. Once Port B is enabled 440, two things occur. First, Port B 410 will begin transmitting TS1 training sets back to Port A 400. Secondly, Port B 410 will check the content of the incoming TS1 training sets 420 to see if the data was received as it was sent. If there is any discrepancy, Port B 410 will correct the incoming signals so that the original content of TS1 420 is restored. At this point, Port B 410 will be trained 460 and will respond by sending the second training set, TS2 430, back to Port A 400.

Meanwhile, Port A 400 has been receiving TS1 data 420 from Port B 410 and performs the same signal integrity checks and correction that Port B has completed. Once both ports are trained with TS1 data 420, the ports will proceed by sending TS2 training data 430. This second training set serves as a redundancy check to verify that the Ports were trained properly with TS1 data 420. In addition, the TS2 data 430 signifies that both ports are trained and are ready to transmit and receive data packets 470. Once a port is transmitting and receiving the TS2 training sequence, it may begin sending data. With physical link errors corrected by the training sequences, the data packets 480 can then transmitted and received by the ports as intended.

In the event the training sequence fails, a timeout may occur and the affected port may be powered down or otherwise deactivated. Thus, when a transmission fault occurs, locating the problems in the physical link is facilitated by determining which port has been deactivated. By comparison, failure isolation in a bus architecture can be difficult because if one attached device fails, the entire system may fail. Discovering which device caused the failure is typically a hit-or-miss proposition.

FIG. 5 shows the actual format and content of the training sets TS1 and TS2. In the preferred embodiment, each training set is 16 words long. It should be appreciated however, that training sets of different lengths are certainly possible. The width of the training set corresponds to the number of physical lanes in a training set. In the preferred embodiment, the training sets are 1, 4, or 12 words wide corresponding to the 1, 4, and 12 lanes in the preferred embodiment of the physical link. Certainly, other combinations of lane quantities are possible, but the width of the training set corresponds to the number of lanes in the physical link. The embodiment shown in FIG. 5 corresponds to a 4 lane link.

Each word in the training set is a 10-bit word that complies with the 8B/10B code discussed above. The first row (COM) in each column is a comma delimiter with a preferred code name K28.5. The second row in each column is a lane identifier that is unique to each lane in the physical link. A table of preferred lane identifiers is shown in FIG. 6. In a single lane link, only lane identifier 0 is used. In a 4 lane link, lane identifiers 0, 1, 2, and 3 are used. In a 12 lane link, all twelve lane identifiers shown in FIG. 6 are used. After the lane identifier, the remaining 14 rows of the 16 row training sets are repeated 10-bit words. For training set 1, the repeated word name is D10.2. For training set 2, the repeated word name is D5.2.

The comma delimiter and lane identifiers are chosen to be insensitive to data inversion. That is, inverting a comma delimiter or a lane identifier symbol changes only the running disparity and not the symbol itself. Consider the 10-bit word for the comma delimiter K28.5. For a negative running disparity, the word is 001111 1010. For a positive running disparity, the word is 110000 0101. These two words are complements of each other. Inverting all the bits in the first word will yield the second word and vice-versa. Hence, regardless of whether or not a bit inversion has occurred in the physical link, when the receiver port decodes this word, the comma delimiter will result. The same is also true for each of the lane identifiers in FIG. 6. For each lane identifier, the 10-bit words for negative running disparity are the complement of the 10-bit word for positive running disparity. Thus, a receiver will always know when a comma delimiter has arrived and which lane identifier corresponds to a given bit stream. The preferred code names selected for the comma delimiter and the lane identifiers were selected because of their inversion properties. Other code words exhibiting the same properties will also work in alternative embodiments.

For training set 1, the preferred 10-bit code name is D10.2 and the bit sequence for positive running disparity is 010101 0101. The D10.2 code word is chosen for the training set because it uses the exact same code word for negative running disparity as it does for positive running disparity. Thus, the receiver expects to receive the 010101 0101 sequence repeated 14 times for each training set 1 packet regardless of the current state of the running disparity. The same conditions hold true for training set number 2. For training set 2, the preferred 10-bit code name is D5.2 and the bit sequence for both positive and negative running disparity is 101001 0101. The preferred code names selected for training set 1 and training set 2 were selected because of their inversion properties. Other code words exhibiting the same properties will also work in alternative embodiments.

Figure 7:
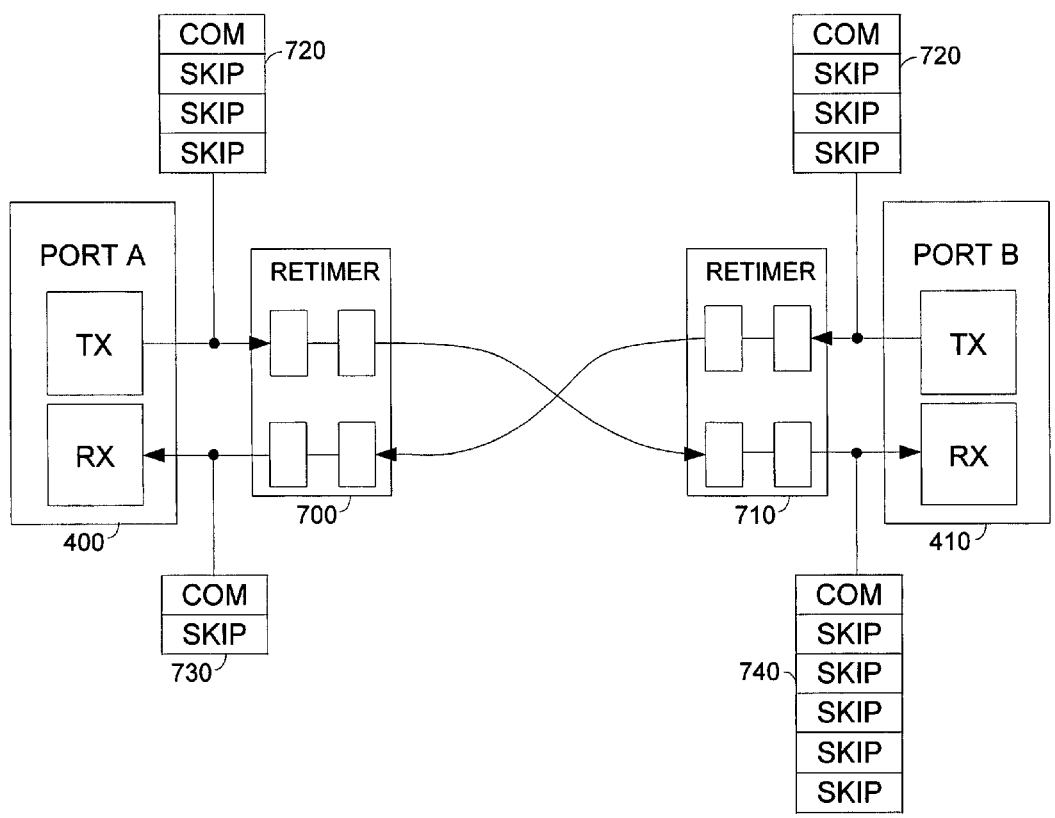
FIG. 7 shows a functional block diagram of a serial physical link.

FIG. 7 shows a block diagram of a preferred embodiment of a serial physical link. Included in the link are Port A 400 and Port B 410 as discussed above. The link shown in FIG. 7 is a 2-lane link with one lane configured to transmit in one direction and the other lane configured to transmit in the opposite direction. Included in the link are retimers 700, 710 located at opposite ends of the link. Retimers 700, 710 provide a means of compensating for minor clock tolerances that result in different clock rates between Port A 400 and Port B 410. To compensate for these clock differences, a data packet called a SKIP ordered set 720 is transmitted at regular intervals amidst the training, data, or idle data packets. In the preferred embodiment, the SKIP ordered sets 720 are inserted every 4608 symbol clocks and include a COM delimiter followed by three SKIP words. As with the training sets, the SKIP ordered sets 720 are as wide as the number of lanes in the link. In FIG. 7, the link contains only one lane, so the SKIP ordered sets 720, contain only one column of 10-bit words.

If a delay is needed to compensate for advanced clock timing, the retimers 700, 710 may insert an additional SKIP word to delay the arrival of subsequent data at the receiving end of the link. This scenario is depicted by the SKIP ordered set 740 shown at the receiver of Port B 410. SKIP ordered set 740 includes two additional SKIP words that have been added by retimer 700 and retimer 710. Consequently, a SKIP ordered set that started with three SKIP words now has a total of five SKIP words. Conversely, if an advance is needed to compensate for delayed clock timing, the retimers 700, 710 may remove an existing SKIP word to advance the arrival of subsequent data at the receiving end of the link. SKIP ordered set 730 shows an example of this scenario. SKIP ordered set 730 contains only one SKIP word as a result of the removal of one SKIP word each by retimer 700 and retimer 710. By compensating for clock tolerances, the link and the Ports on either end of the link can operate in a common clock domain.

In the preferred embodiment, the SKIP word name is K28.0 and the associated 10-bit word is 001111 01000 for negative running disparity and 110000 1011 for positive running disparity. As is the case with the COM and lane identifier words, the SKIP word is insensitive to bit inversion. Other code words exhibiting the same property will also work in alternative embodiments.

Figure 8:
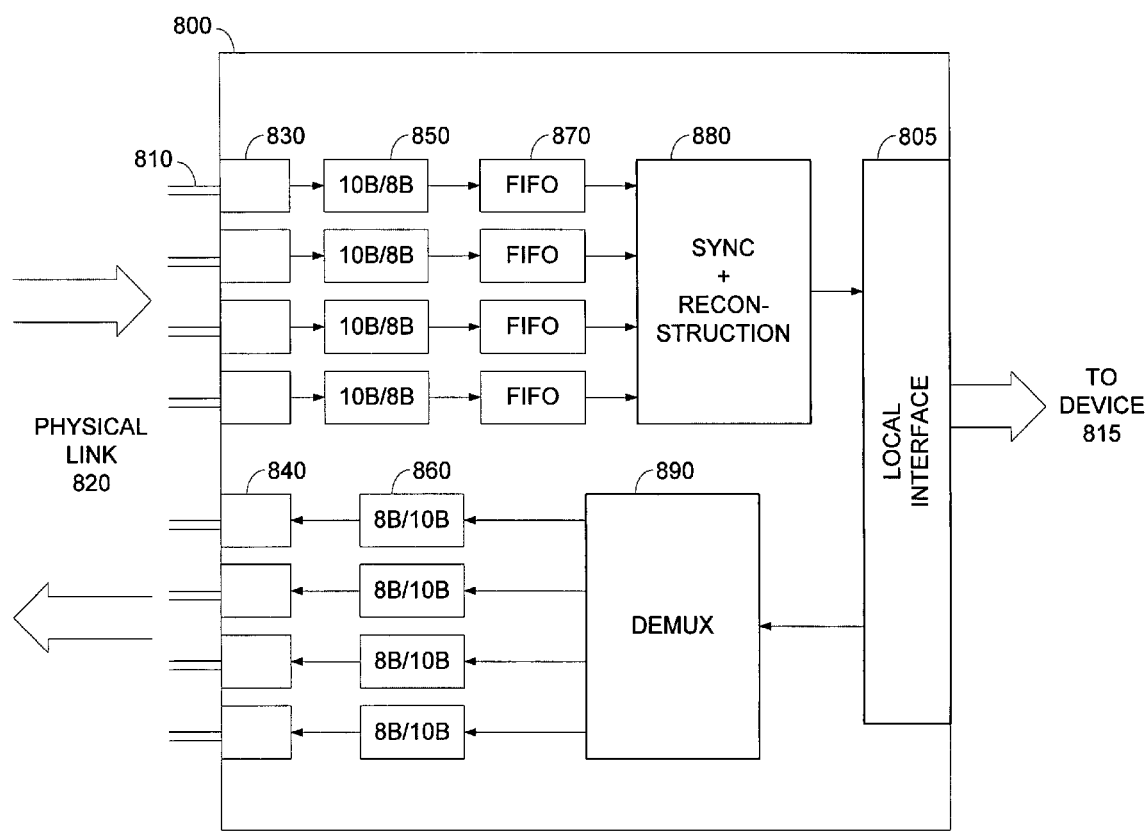
FIG. 8 shows a functional block diagram of an adapter configured to transmit and receive differential signals.

FIG. 8 shows a block diagram of an adapter 800 configured to convert signals transmitted to and received from a physical link 820. The adapter may be coupled to or otherwise form a part of a port and/or a channel adapter. The adapter 800 is coupled to differential wires or traces 810 in the physical link. Differential signals received from the physical link 820 are detected by a lane receiver 830 that converts the differential signals to a bit stream that is sent to a 10B/8B decoder 850. The decoder converts the 10 bit words received from the individual lanes into 8 bit words that are directed to the FIFO buffers 870. In an alternative embodiment, the FIFO buffers 870 may precede the 10B/8B decoders. After the 10B/8B decoders and FIFO buffers, the 8-bit words are synchronously clocked into a multiplexer or other suitable logic device 880 to reconstruct a single byte stream from the individual byte streams. The byte stream is then sent to a local interface 805 for transmission to the local device 815.

The adapter 800 may also convert signals for transmission to a physical link 820. A byte stream from a local device 815 is detected and transmitted to a demultiplexer 890 that stripes bytes from the single byte stream across a number of individual byte streams. FIG. 8 depicts four lanes in the physical link, but this quantity may be different and may depend on whether the link is coupled to a single channel adapter. The individual byte streams are then coded by the 8B/10B encoders and the resulting bit streams are delivered to lane transmitter 840 which convert the bit streams to differential signals for transmission across wire pairs or traces 810 in the physical link 820.

Figure 9:
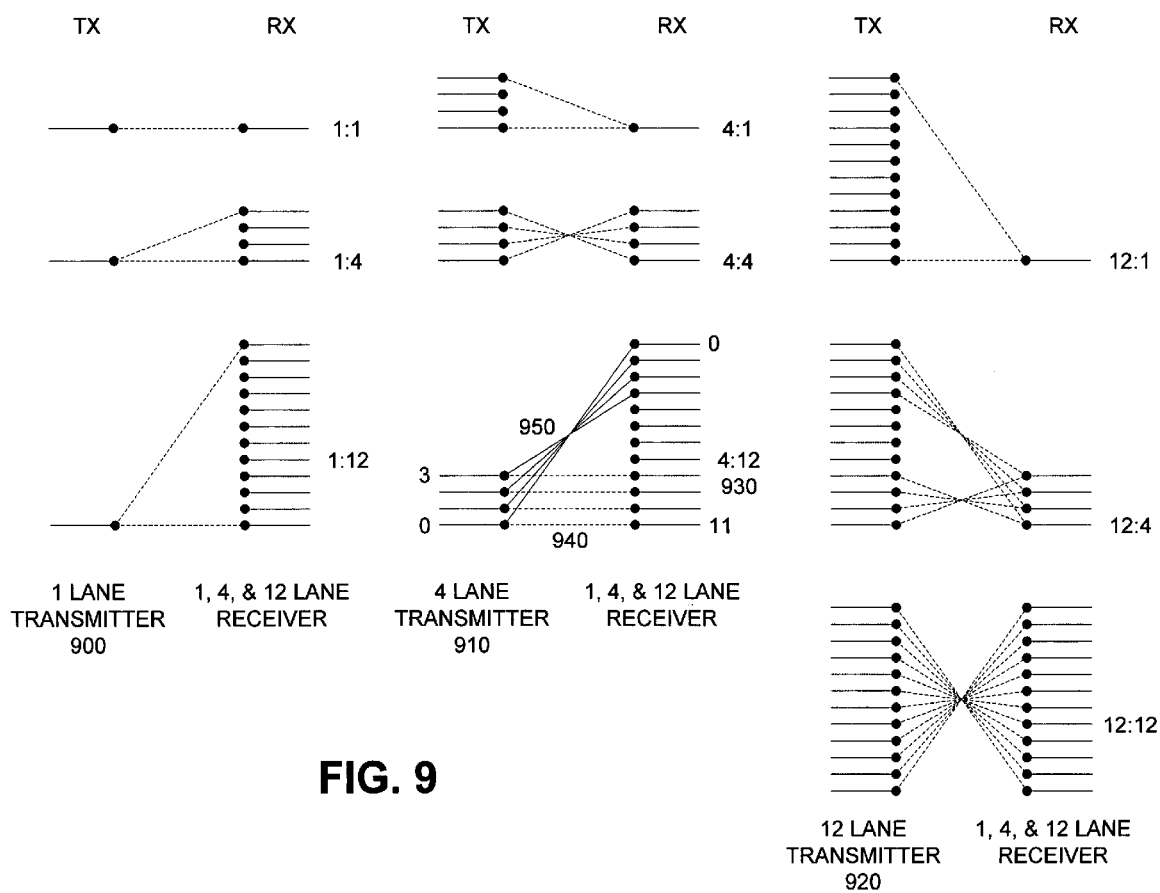
FIG. 9 shows a diagram depicting the combinations of links between 1, 4, and 12 lane ports.

As discussed above, the Infiniband links will implement 1, 4, or 12 lanes in each direction. The Infiniband specification further imposes requirements to support mixed bus widths. An automatic link configuration routine will determine the width supported by the link and the two ports. Thus, when mixed bus widths are connected serially, the ports will only transmit data through the smaller quantity of lanes. For example, when a 12 lane link is coupled to a to a 4 lane link, only 4 of the 12 lanes in the former link will be used. Correction of lane reversal errors must consider all combinations of bus widths to guarantee that the signals traveling through the physical media are in the correct order. FIG. 9 shows the possible combinations for Infiniband links. The combinations In FIG. 9 are grouped into three columns with the left most column showing a I lane transmitter 900 coupled to 1, 4, and 12 lane receivers. The center column shows a 4 lane transmitter 910 coupled to 1, 4, and 12 lane receivers and the right most column shows a 12 lane transmitter 920 coupled to 1, 4, and 12 lane receivers. Lane reversal is not an issue in a 1 to 1 connection, but it is included in FIG. 9 in the interest of thoroughness.

For the remaining eight combinations, it is possible that the order of the lanes in the 4 and/or 12 lane links may be reversed. As an example, consider the 4 to 12 transition 930 located in the center column of FIG. 9. In this example, a 4 lane transmitter is coupled to a 12 lane receiver. The automatic link configuration will establish lanes 0, 1, 2, and 3 of the 12 lane link as the signal carriers for this setup. During training, the transmit port will send training set data (TS1 and TS2) to the receive port. Since the training set data in each lane is labeled by a lane identifier (as shown in FIG. 6), the receive port can determine the identity of each lane. In this example, without any prior knowledge of lane reversal errors, 4 lanes of training set 1 data are incorrectly received by lanes 8, 9, 10, and 11 of the 12-lane receiver 940. The receiver then corrects this error by redirecting the incoming lanes 950 to receiver lanes 0, 1, 2, and 3. The results of the correction are verified by the receiver by checking the lane identifiers received in subsequent training set data. If corrected, the receiving port will respond by transmitting TS2 data back to the transmitting port to indicate the port is ready to receive data packets.

Figure 10:
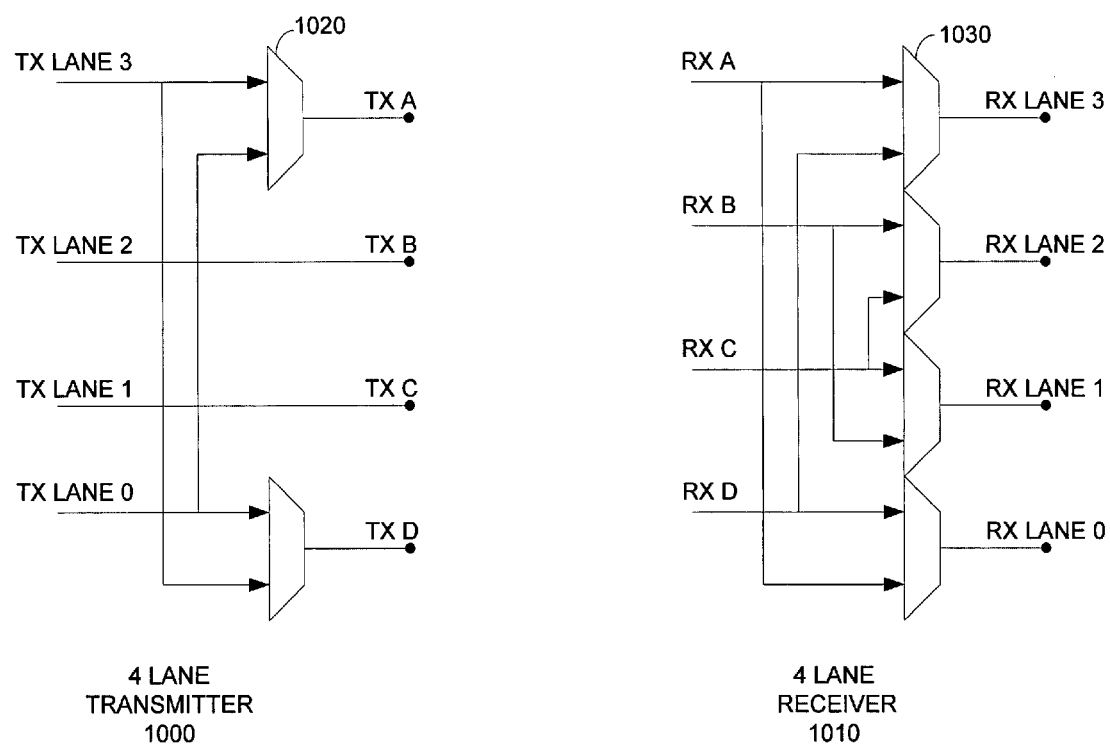
FIG. 10 shows a block diagram of the multiplexer logic used to correct lane reversal in a four lane port.
Figure 11:
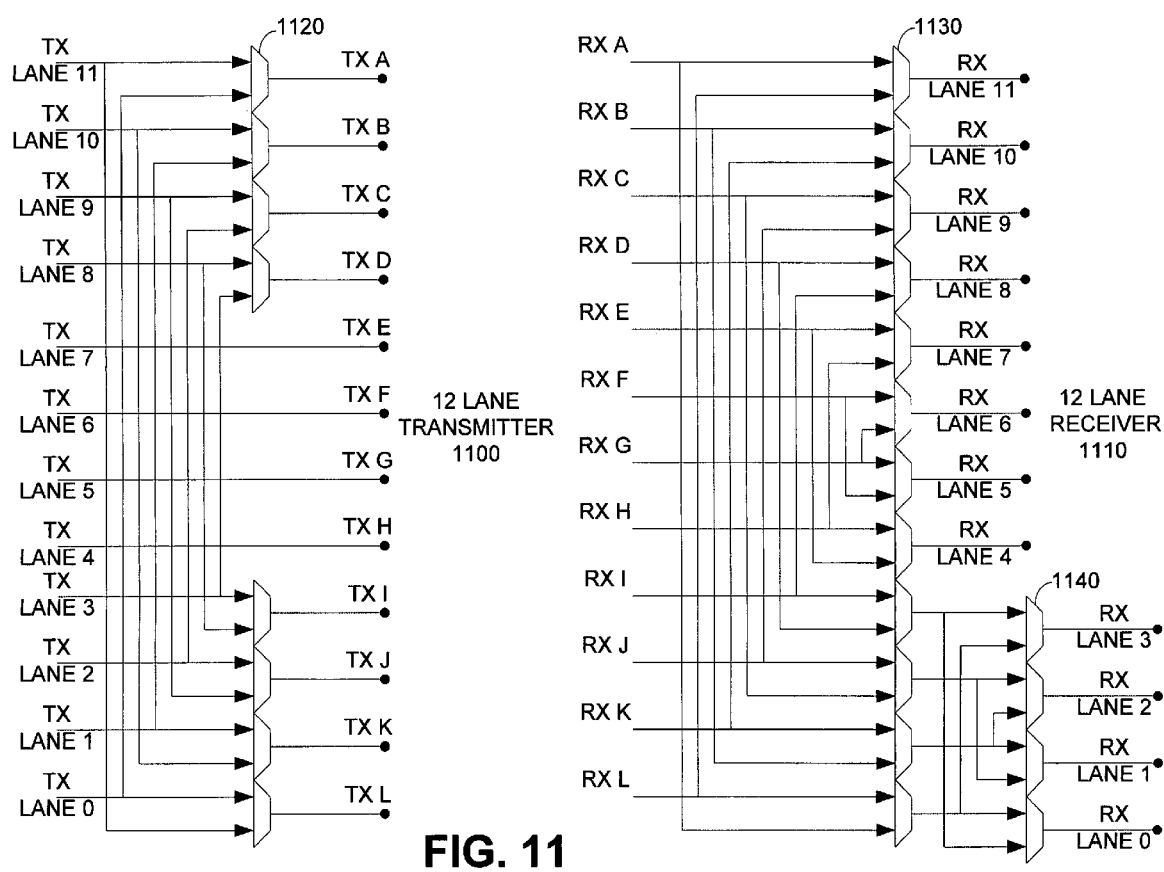
FIG. 11 shows a block diagram of the multiplexer logic used to correct lane reversal in a twelve lane port.

Lane reversal errors including the example above may be corrected via a bank of 2 to 1 multiplexers configured to reorder the individual lanes in a physical link. FIG. 10 shows the multiplexer logic necessary in the receiver and transmitter of a 4 lane port. FIG. 11 shows the multiplexer logic necessary in the receiver and transmitter of a 12 lane port. Multiplexers are used to combine several signals for transmission on some shared medium. In this preferred embodiment, the multiplexers are logic devices configured to transmit a selected one of the two input signals as necessary to change the order of the incoming signals.

Consider the 4 lane transmitter 1000 shown in FIG. 10. The 4 lane transmitter uses two 2 to 1 multiplexers 1020 to trade signals on lanes 0 and 3. If a 4 lane transmitter is coupled to a 1 lane receiver, signals will exist on only one of the four lanes of the 4 lane link. The signal may exist on either TX LANE 0 or TX LANE 3 and the 1 lane receiver may be coupled to either TX A or TX D. The 2 to 1 multiplexers 1020 are capable of directing the signal to account for any of the above situations. The signal may be transmitted to TX A from either TX LANE 0 or TX LANE 3. Similarly, the signal may be transmitted to TX D from either TX LANE 0 or TX LANE 3.

The bank of 2 to 1 multiplexers 1030 used in a 4 lane receiver 1010 may direct signals from RX_A, RX_B, RX_C, AND RX_D to RX LANE 0, RX LANE 1, RX LANE 2, and RX LANE 3, respectively. In the event the 4 lanes are reversed, the signals may be rerouted (via the multiplexer bank) so that the signals from RX_A, RX_B, RX_C, AND RX_D are directed to RX LANE 3, TX LANE 2, RX LANE 1, and RX LANE 0, respectively.

Referring now to FIG. 11, the multiplexer logic for 12 lane transmitters and receivers are capable of the same type of lane reversal described for the 4 lane case. Naturally, the number of multiplexers needed to accomplish the same tasks goes up because the number of lanes has gone up. The 12 lane transmitter 1100 may require 8 multiplexers 1120 whereas the 4 lane transmitter needed 2 multiplexers. As an example, if the 12 lane transmitter 1100 is coupled to a 4 lane receiver, a situation may arise where the transmit signals reside on TX LANE 11, TX LANE 10, TX LANE 9, and TX LANE 8 while the 4 lane receiver is coupled to TX_I, TX_J, TX_K, AND TX_L. The multiplexer bank may redirect the signals so the 4 lane receiver will now receive the data. This example may further be complicated by the possibility that the signals on TX_I, TX_J, TX_K, AND TX_L are reversed as they enter the 4 lane receiver. This additional reversal may be easily corrected by the multiplexer bank 1030 shown in FIG. 10.

The 12 lane receiver 1110 shown in FIG. 10 includes two banks of multiplexers 1130, 1140. The bank of 12 multiplexers 1130 may be configured to reverse all twelve input lanes RX A through RX L. The bank of 4 multiplexers 1140 may be configured to reverse the lower 4 lanes (i.e., RX LANE 0 through RX LANE 3). It should be noted that this latter set of multiplexers 1140 are independent of the former set 1130 and as a result, the 12 lane receiver may perform up to two independent reversals.

Figure 12:
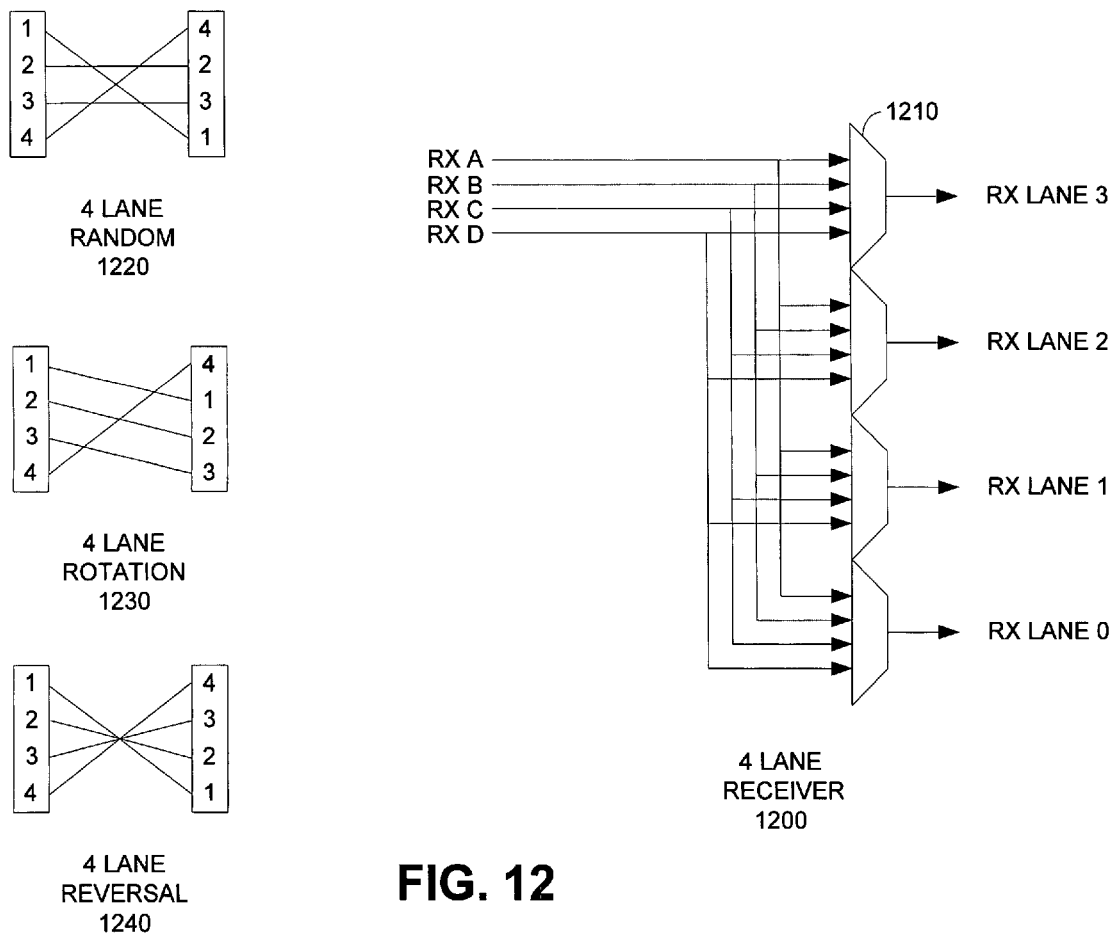
FIG. 12 shows a block diagram of the multiplexer logic used to correct general lane reordering in a four lane port.

It should also be noted that a preferred, more general correction to lane reordering may be implemented. This solution is shown in FIG. 12. In this alternative embodiment, a bank of 4 to 1 multiplexers 1210 are used to correct for any general lane reordering error. Examples of reordering errors are shown in FIG. 12 and include random reordering 1220, rotation 1230, and reversal 1240. The multiplexers 1210 in this embodiment of a 4 lane receiver 1200 are capable of re-routing the signals from RX A through RX D to any combination of lanes RX LANE 0 through RX LANE 3. A similar solution is possible for a 12 lane receiver, which must implement a bank of twelve 12 to 1 multiplexers.

The logic required to correct lane reversal in the above embodiments has been described as a series of logic multiplexers. The same tasks may be accomplished via a matrix of transistor logic devices or a series of AND and OR logic gates. Other embodiments may be implemented to accomplish the same tasks. The description and claims herein are not intended to limit the scope of the invention to include only multiplexers, but rather the lane reordering may be accomplished by any of a number of devices capable of performing the same function. In addition, the preferred and alternative embodiments described herein need not be limited to 1, 4 and 12 lanes as required by the Infiniband specification. The above described embodiments may optionally be applied to links with other lane quantities.

The above discussion is meant to be illustrative of the principles and various embodiments of the present invention. Numerous variations and modifications will become apparent to those skilled in the art once the above disclosure is fully appreciated. For example, a physical link with the above properties and characteristics may be constructed with eight or sixteen lanes per link and still operate within the scope of this description. It is intended that the following claims be interpreted to embrace all such variations and modifications.

What is claimed is:

1. A high speed interconnection link that comprises:
   a receiver configured to receive a plurality of channels;
   a receiver logic circuit configured to receive signals from each of the plurality of channels and monitor the signals for symbols that are unique to each channel, wherein upon detecting unexpected symbols in the channels, the receiver logic circuit is configured to correct the order of the channels;
   wherein the channel order correction is performed while a first set and a second set of training data are transmitted through the link;
   wherein the training data comprises a binary word sequence that Is transmitted across each channel in the link, wherein a first word of the sequence is a comma symbol and a second word of the sequence is the unique channel symbol.

2. A method of correcting the order of data signals received via a plurality of channels, wherein the method comprises:
   transmitting symbols across the plurality of channels, wherein the symbols are unique to each channel; and
   ordering the channels so that the unique symbols arrive at respective predetermined buffers;
   wherein the plurality of channels are part of a communications link comprising a transmitter port and a receiver port wherein:
      the receiver port comprises a lane reorder circuit that is configured to reroute the channel signals if the receiver port detects an unexpected channel symbol in the signals transmitted by the transmitter port; and
      a transmit port comprising a lane reorder circuit that is configured to reroute the channel signals if the transmit port does not detect a predetermined response from the receiver port;
   wherein the order of the data signals is corrected during the transmission of a first and a second set of training data, the training data comprising a predetermined sequence of binary words that are transmitted through each channel in the link, wherein at least one of the binary words transmitted through each channel is a unique lane identifier.

3. The method of claim 2 wherein said transmitting includes:
   the transmitter port transmitting the first set of training data to the receiver port;
   the receiver port transmitting the first set of training data to the transmitter port if the receiver port receives the first set of training data;

the transmitter port transmitting the second set of training data to the receiver port if the transmitter port successfully detects a set of training data from the receiver port; and the receiver port transmitting the second set of training data to the transmitter port if the receiver port successfully detects a set of training data;

wherein once both ports are transmitting and receiving the second set of training data, correction of the order of data signals in the channels is complete and the link is property configured to transmit data.

* * * * *

UNITED STATES PATENT AND TRADEMARK OFFICE
CERTIFICATE OF CORRECTION

| | |
|---|---|
| PATENT NO. | : 6,961,347 B1 |
| APPLICATION NO. | : 09/597190 |
| DATED | : November 1, 2005 |
| INVENTOR(S) | : William P. Bunton et al. |

It is certified that error appears in the above-identified patent and that said Letters Patent is hereby corrected as shown below:

In column 3, line 62, delete "Obits" and insert -- 0 bits --, therefor.

In column 4, line 63, after "serial" insert -- I/O --.

In column 6, line 64, delete "am" and insert -- are --, therefor.

In column 7, line 1, after "300" insert -- with a --.

In column 7, line 4, delete "falls" and insert -- fails --, therefor.

In column 10, line 31, delete "I" and insert -- 1 --, therefor.

In column 12, line 32, in Claim 1, delete "Is" and insert -- is --, therefor.

In column 14, line 4, in Claim 3, delete "property" and insert -- properly --, therefor.

Signed and Sealed this

Thirteenth Day of July, 2010

David J. Kappos
*Director of the United States Patent and Trademark Office*